(12) United States Patent
Oh et al.

(10) Patent No.: US 7,204,537 B1
(45) Date of Patent: Apr. 17, 2007

(54) ADJUSTABLE TRUCK BOX EXTENDER FLIP GATE

(76) Inventors: Kwang Jin Oh, 2025 Pray St., Fullerton, CA (US) 92833; Lorren Oh, 2025 Pray St., Fullerton, CA (US) 92833

( * ) Notice: Subject to any disclaimer, the term of this patent is extended or adjusted under 35 U.S.C. 154(b) by 0 days.

(21) Appl. No.: 11/449,878

(22) Filed: Jun. 9, 2006

(51) Int. Cl.
- *B26D 33/023* (2006.01)
- *B26D 33/03* (2006.01)
- *B26D 33/033* (2006.01)

(52) U.S. Cl. ............... 296/26.09; 296/26.1; 296/26.11; 296/51; 296/57.1

(58) Field of Classification Search ................ 296/50, 296/51, 57.1, 26.01, 26.02, 26.03, 26.08–26.11; 224/402, 403, 405
See application file for complete search history.

(56) References Cited

U.S. PATENT DOCUMENTS

| | | | |
|---|---|---|---|
| 5,133,584 A * | 7/1992 | McCleary | 296/61 |
| 5,816,638 A * | 10/1998 | Pool, III | 296/26.11 |
| 5,924,753 A * | 7/1999 | DiBassie | 296/26.09 |
| 6,142,548 A * | 11/2000 | Kuhn et al. | 296/26.1 |
| 6,179,360 B1 * | 1/2001 | Davian | 296/50 |
| 6,378,926 B1 * | 4/2002 | Renze et al. | 296/26.11 |
| 6,422,627 B1 * | 7/2002 | Kuhn et al. | 296/26.1 |
| 6,422,630 B1 * | 7/2002 | Heaviside | 296/57.1 |
| 6,513,850 B1 * | 2/2003 | Reed | 296/26.08 |
| 6,550,841 B1 * | 4/2003 | Burdon et al. | 296/57.1 |
| 6,568,733 B1 * | 5/2003 | Lacy | 296/26.09 |
| 6,575,516 B2 * | 6/2003 | Webber | 296/61 |
| 6,698,810 B1 * | 3/2004 | Lane | 296/3 |
| 6,746,066 B2 * | 6/2004 | Reed | 296/26.08 |
| 6,890,013 B2 * | 5/2005 | Lacy | 296/26.09 |
| 6,948,755 B1 * | 9/2005 | Bauer | 296/37.6 |
| 6,964,444 B2 * | 11/2005 | Chumley et al. | 296/26.08 |
| 6,991,277 B1 * | 1/2006 | Esler | 296/50 |
| 6,994,389 B1 * | 2/2006 | Graffy et al. | 296/26.11 |
| 7,021,689 B1 * | 4/2006 | Weisbeck, III | 296/26.11 |
| 7,121,604 B2 * | 10/2006 | Reed | 296/26.11 |

* cited by examiner

*Primary Examiner*—D. Glenn Dayoan
*Assistant Examiner*—Greg Blankenship
(74) *Attorney, Agent, or Firm*—Eugene Oak

(57) ABSTRACT

A pick-up truck box extender flip gate is provided. The truck box extender flip gate of the current application is comprised of; 1) a tail gate attaching frame, 2) two side faces, each of which is comprised of one guide and one metal frame. 3) a first front face that is rotatably connected to the two guides, and 4) a second front face that is rotatably connected to the first front face via hinges. When the pick-up truck box extender flip gate is in retracted position, the two guides are embedded in two rectangular metal frames which are welded to both ends of the tail gate frame. The first front face and the second front face are overlapped with the tailgate-attaching frame when the flip gate is retracted. In extended position, the first front face and second front faces come out of the attaching frame to extend the pick-up truck cargo box space. The first and second front faces have racks for holding bicycle wheel or long ladder's leg. The pick-up truck box extender flip gate of the current application occupies less space than previous truck box extenders and renders additional space to a pick-up truck.

1 Claim, 8 Drawing Sheets

ADJUSTABLE TRUCK BOX EXTENDER FLIP GATE

FIELD OF THE INVENTION

Current application is related with a pick-up truck box extender, especially related with an adjustable flip gate type extender that has racks for securing legs of long ladder and wheels of bicycles and motorcycles.

BACKGROUND OF THE INVENTION

Most conventional pick-up truck box extenders are installed inside of a truck box and it occupies certain inside volume thereof. Therefore, most of pick-up truck owners stretch the extender unnecessarily though the inside volume of the truck box is large enough. To lead a bulky cargo, the extender must be detached from the truck box first. Load the cargo into the box and then attach the extender again. The extender becomes another load. However, it is still unstable to load a tall cargo due to the fixed length of the extender. Using the conventional extender as a divider is limited because size of each cargo is different. In addition to this, if a toolbox is already mounted in the truck box, it is very hard to carry additional cargo such as a long size ladder or leisure items like bicycles, motorcycles, etc. It is a purpose of the current application to provide a pick-up truck box extender that occupies minimum space of the truck box and enables to carry additional cargos such as long ladder, bicycles and motorcycles without detaching the extender from the truck cargo box. Another purpose of the current application is to provide an adjustable truck box extender that has racks for legs of a long ladder and wheels of bicycles and motorcycles to load them on the truck more securely and safely

DESCRIPTION OF THE PRIOR ART

U.S. Pat. No. 6,402,215, U.S. Pat. No. 6,113,173, U.S. Pat. No. 5,700,047 and U.S. Pat. D418,106 to Leitner, at al. illustrate a truck bed extender that includes a first side wall, a second side wall, a connecting wall, a first amount and a second mount. The connecting wall extends between the first sidewall and the second sidewall, and cooperates with the first sidewall and second sidewall to form a generally U-shaped frame.

U.S. Pat. No. 5,857,724 to Jarman illustrates an apparatus for extending a vehicle cargo which includes a main panel having a first end adapted for pivotally attaching to a tailgate, the main panel including non-planar sections formed therein; and a pair of side panels pivotally attached to opposite sides of the main panel.

U.S. Pat. No. 5,820,188 to Nash illustrates a truck bed extender having a pair of generally parallel, spaced apart sidewalls, which are joined to a back wall, and having an open top and an open bottom.

U.S. Pat. No. 5,806,907 to Martinus, et al. illustrates a quick release fold-up tailgate assembly. Hinges having a socket portion connected to the tailgate and a pin portion loosely insertable into the socket portion and quickly removable from the socket portion to release quickly the tailgate attachment from the vehicle.

U.S. Pat. No. 5,775,759 to Cummins illustrates an extender. The extender includes a rear section pivotally attached to the bottom section and opposed side sections pivotally attached to the rear section.

U.S. Pat. No. 5,765,892 to Covington illustrates an extension apparatus comprises a rear panel, which has opposing first and second ends, pivotally couplable to the tailgate to pivot the rear panel between a side-board configuration and a cargo-bed extension configuration.

U.S. Pat. No. 5,755,480 to Bryan illustrates a truck bed extension characterized by a pair of quick release cleats and brackets to facilitate rapidly loading and unloading the truck bed extension on the truck tailgate at the rear end of the bed of a pickup truck.

U.S. Pat. No. 5,752,800 to Brincks, et al. illustrates a pick-up truck ramp/bed extender comprised of collapsible sections which, when fully extended and supported by supplementary rigid structures, provide a quick, convenient, and sturdy loading surface whereupon small machinery such as motorcycles, lawn mowers and snow mobile may be loaded into the truck bed with little effort.

U.S. Pat. No. 5,658,033 to Delaune illustrates an apparatus for extending a pickup truck bed includes a removable frame that can be connected to the pickup truck bumper of its hitch receiver.

U.S. Pat. No. 5,468,038 to Sauri illustrates a vehicle tailgate extender includes an extension member retractably mounted between inner and outer tailgate walls. In the stowed position, the extension members are substantially entirely enclosed by the tailgate walls. In the operative position the extension member extends from an opening in a top surface of the tailgate located intermediate the tailgate walls.

U.S. Pat. No. 4,596,417 to Bennett illustrates a combination-loading ramp and tailgate closure device that is releasable mounted on the rearward portion of the truck having the tailgate in an extended position.

U.S. Pat. D365,323 to Napierkowski, et al. illustrates a folding tailgate cargo stop and U.S. Pat. D291,789 to Noga illustrates a truck bed extension.

None of the prior art illustrates an adjustable pick-up truck box extender that is easily adjusted for loading various kinds of cargos as shown in the current application.

SUMMARY OF THE INVENTION

Most conventional pick-up truck box extenders are installed inside of a truck box and it occupies certain inside volume thereof. To load a bulky cargo, the extender must be detached from the truck box first. Load the cargo into the box and then attach the extender again. The extender becomes another load. However, it is still unstable to load a tall cargo due to the fixed length of the extender. Using the conventional extender as a divider is limited because size of each cargo is different. In addition to this, if a toolbox is already mounted in the truck box, it is very hard to carry additional cargo such as a long size ladder or leisure items like bicycles, motorcycles, etc. It is a purpose of the current application to provide a pick-up truck box extender that occupies minimum space of the truck box and enables to carry additional cargos such as long ladder, bicycles and motorcycles without detaching the extender from the truck cargo box. Another purpose of the current application is to provide an adjustable truck box extender that has racks for legs of a long ladder and wheels of bicycles and motorcycles to load them on the truck more securely and safely. The truck box extender flip gate of the current application is comprised of a tail gate attaching frame, 2) two side faces, each of which is comprised of one guide and one metal frame, 3) a first front face that is rotatably connected to the two guides, and 4) a second front face that is rotatably connected to the first front face via hinges. When the pick-up truck box extender flip gate is in retracted position, the two guides are embedded in two rectangular metal frames which are welded to both ends of the tail gate frame. The first front face and the second front face are overlapped with the tailgate-attaching frame when the flip gate is retracted. In extended position, the first front face and second front faces come out of the attaching frame to extend the pick-up truck cargo box space.

DETAILED DESCRIPTION OF THE PREFERRED EMBODIMENT

Figure 1:
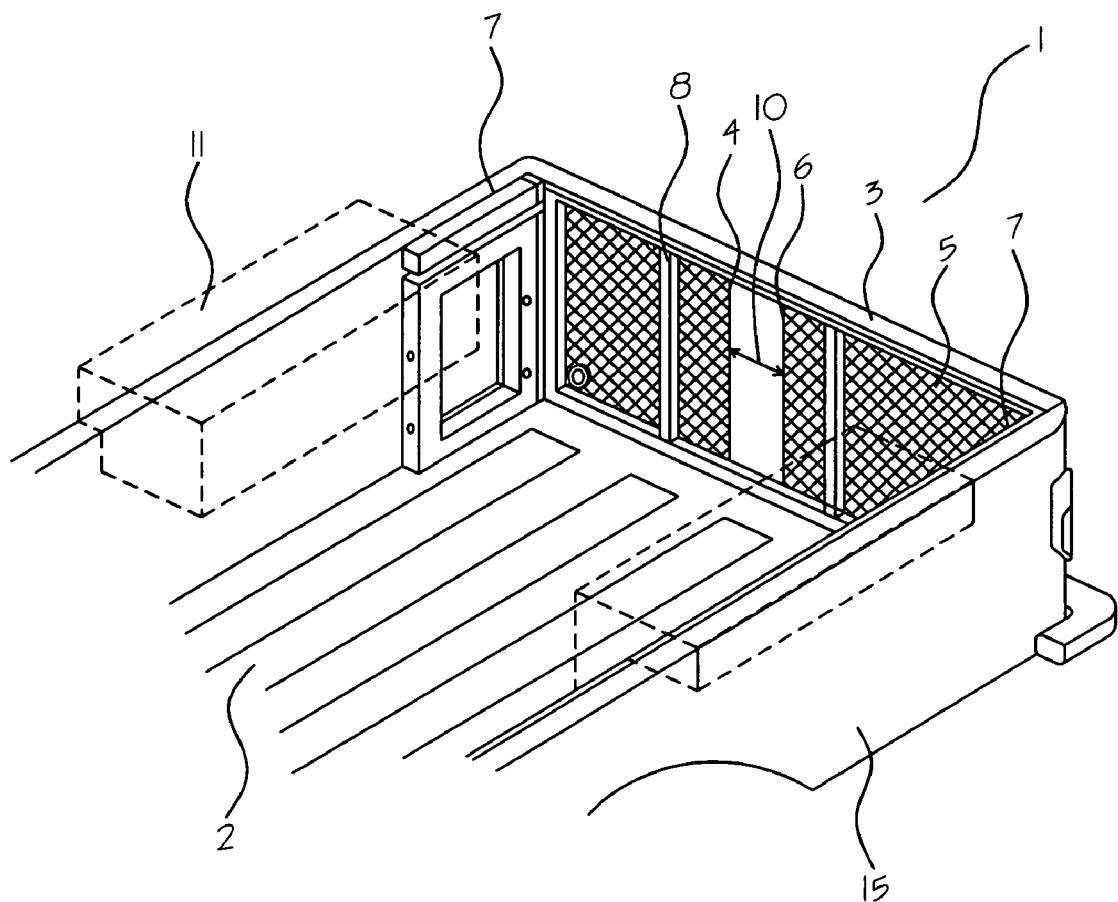
FIG. 1 is a perspective drawing of an adjustable truck box extender flip gate of the current application retracted and installed in pick-up truck box.

FIG. 1 is a perspective drawing of an adjustable truck box extender flip gate (1) of the current application retracted and installed in pick-up truck box (2). The adjustable truck box extender flip gate (1) of the current application is comprised of ½ inch by ½ inch square pipes (3) of carbon steel, stainless steel rods (4), and carbon steel mesh (5). The flip gate has a first front face (6), two side faces (7), and a second front face (9). The two side faces (7) are perpendicular to the first front face (6). The two side faces (7) are comprised of two metal frames (19) and two guides (13). The first front face (6) is reinforced by vertical square pipes (8) and stainless steel rods (4), and metal meshes (5). Numbers of stain less rods (4) and vertical square pipes (3) are adjusted according to need of the user. The carbon steel mesh (5) is eliminated from the space (10) between the stainless rods (4) to allow a part of cargo to pass through. Due to the size of the square metal pipes (3), the adjustable truck box extender flip gate (1) of the current application does not occupy large space in the pick-up truck box (2). Therefore, the gate (1) can be installed in a truck box (2) without removing tool boxes (11) which are already installed thereof.

Figure 2:
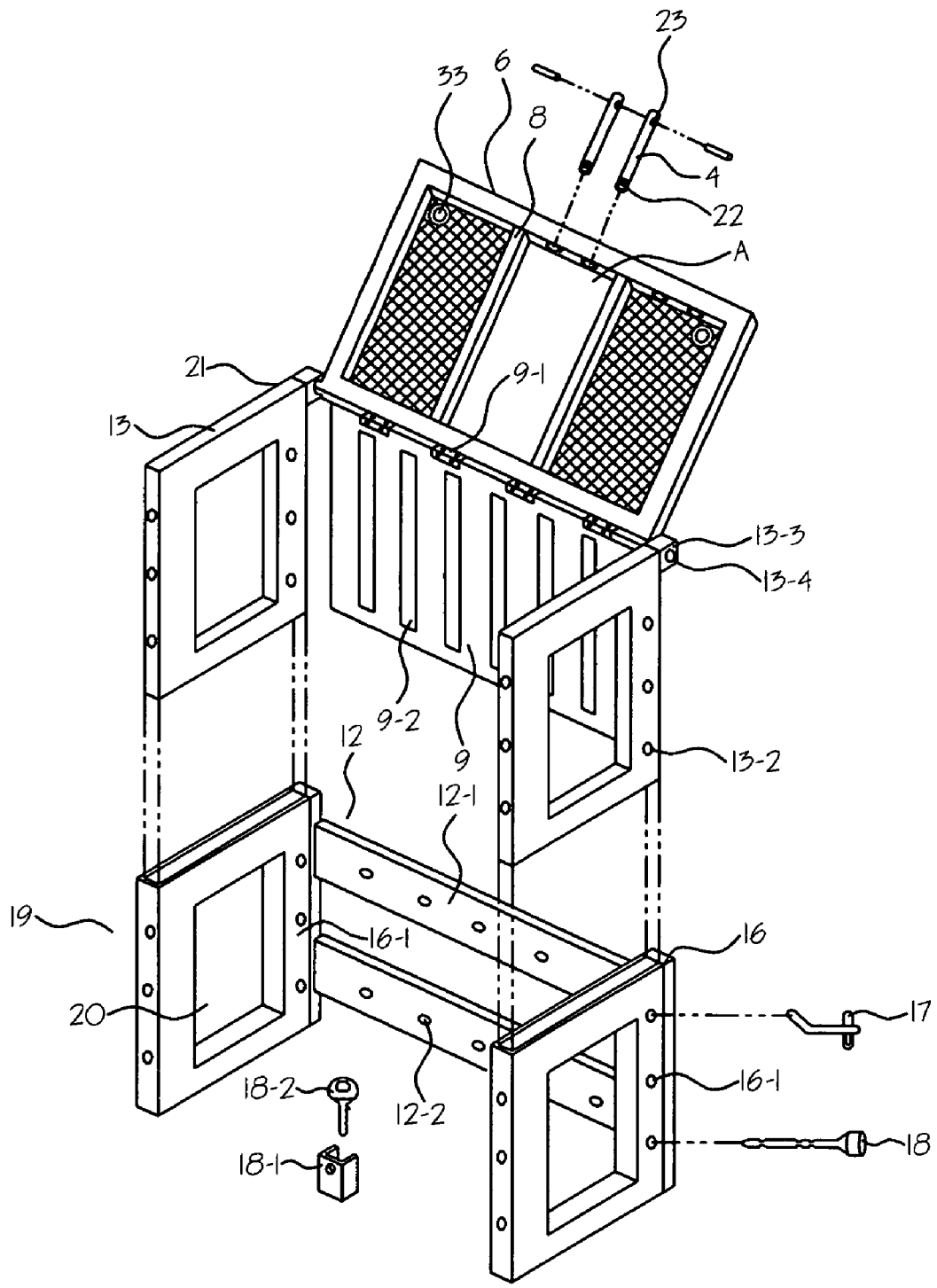
FIG. 2 is an exploded view of the adjustable truck box extender flip gate of the current application.

FIG. 2 is an exploded view of the adjustable truck box extender flip gate (1) of the current application. The flip gate (1) is comprised of; 1) a tail gate attaching frame (12), 2) two side faces (7), each of which is comprised of one guide (13) and one metal frame (19), 3) a first front face (6) rotatably connected to two guides (13), and 4) a second front face (9) that is rotatably connected to the first front face (6) via hinges (9-1).

The tail gate attaching frame (12) is comprised of two long metal plates (12-1) of ¼ inch thickness, which are horizontally fixed to inside surface of a tail gate (14) of a pick-up truck (15) by screwing bolts though the bolting holes (12-2). Two, 1 inch by ½ inch, rectangular metal pipes (16) are welded to both ends of the two long metal plates (12-1) of the attaching frame (12).

Pluralities of pin holes (16-1) are developed on both sides of the metal frames (19) to allow hitching pin (17) and anti-theft locking pin (18) penetrate the rectangular metal pipe (16). Two metal frames (19) made of ¼ inch metal plates, having a rectangular empty space (20) in each frame, are welded to the rectangular pipes (16), positioning vertical to the long metal plates (12-1) of the attaching frame (12). Each of the two guide (13) is comprised of four ½ inch square pipes of same length welded each other at the ends (21). On the guides (13), a number of inner pin holes (13-2), which is the same size and the same number of the pin holes (16-1) on the metal frames (19), are developed. Each of the rear pipes (13-3) has one hole (13-4) to receive the first front face (6) rotatably and welded to rear upper end of the guide (13).

The first front face (6) of the adjustable truck box extender flip gate (1) of the current application is comprised of ½ inch by ½ inch square metal pipes connected by welding in a large rectangular shape. Two or more vertical pipes (8), stainless steel rods (4), and carbon steel mesh (5) reinforce the front face (6). A male screw (22) is developed on one end of each stainless steel rod (4). One pin (23) hole for a stopper pin (24) is formed on the other end of the stainless steel rod (4).

The second front face (9) is made of one metal sheet, such as aluminum, stainless steel or carbon steel of ¼ inch thickness. The second front face (9) is rotatably connected to the first front face (6) via plurality of hinges (9-1). A plurality of racks (9-2) are developed on the second front face (9) to receive wheel of bicycle or leg of ladders.

The guides (13) are inserted into the metal frame (19) when the adjustable truck box extender flip gate (1) of the current application is in a retracted position. Then the anti-theft locking pin (18) and lock (18-1) are engaged through pin holes (16-1) and (13-2) that are located at the bottom. When a user wants to extend the adjustable truck box extender flip gate (1) of the current application, he/she disengages the anti-theft locking pin (18) and lock (18-1) and pulls out the first front face (6) from the rectangular pipes while gripping the tip of the front face. After the first front face (6) lifted up to a desired position, engage hitching pins (17) through pin holes (16-1) and (13-2) which are located on a proper position.

Figure 3:
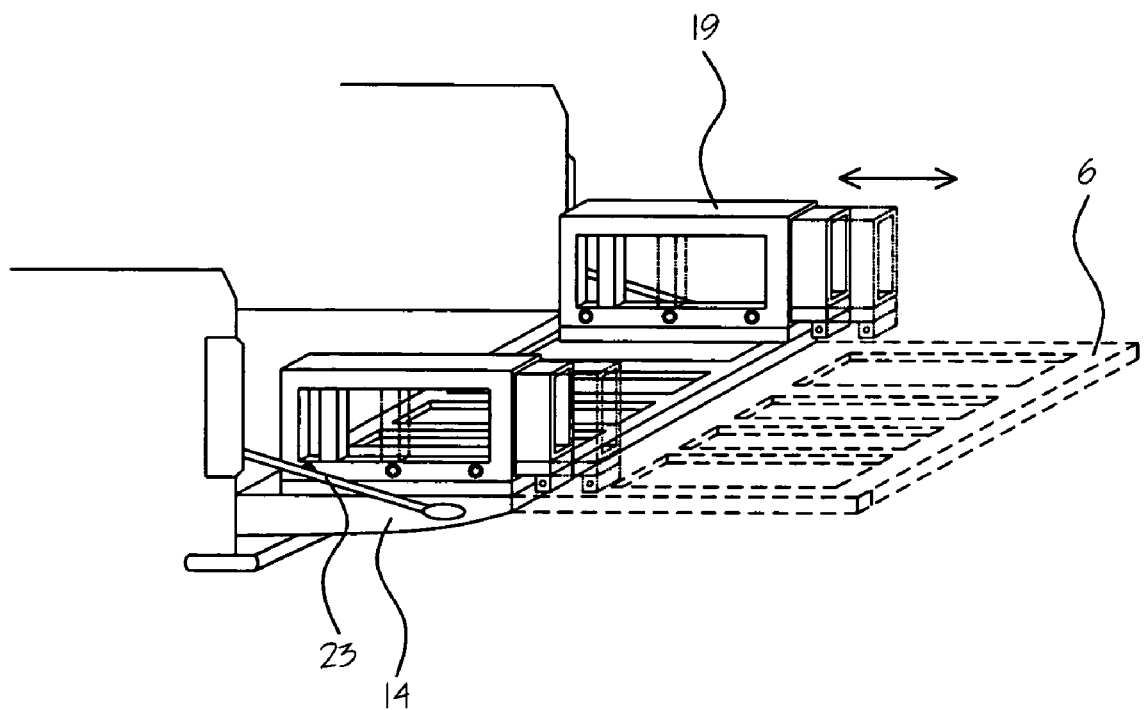
FIG. 3 is a schematic drawing of the adjustable truck box extender flip fate of the current application showing an expanded and retracted position of the first face of the fate when the tailgate of a pick-up truck is open.

FIG. 3 is a schematic drawing of the adjustable truck box extender flip gate (1) of the current application in a position of expanded and retracted when the tail gate (14) of a pick-up truck (15) is open. The tail gate (14) is supported by strut braces (23) on opposite side of the tail gate (14). When the flip fate (1) is retracted, the only contribution of the flip gate (1) is forming a guard rail provided by the metal frames (19).

Figure 4:
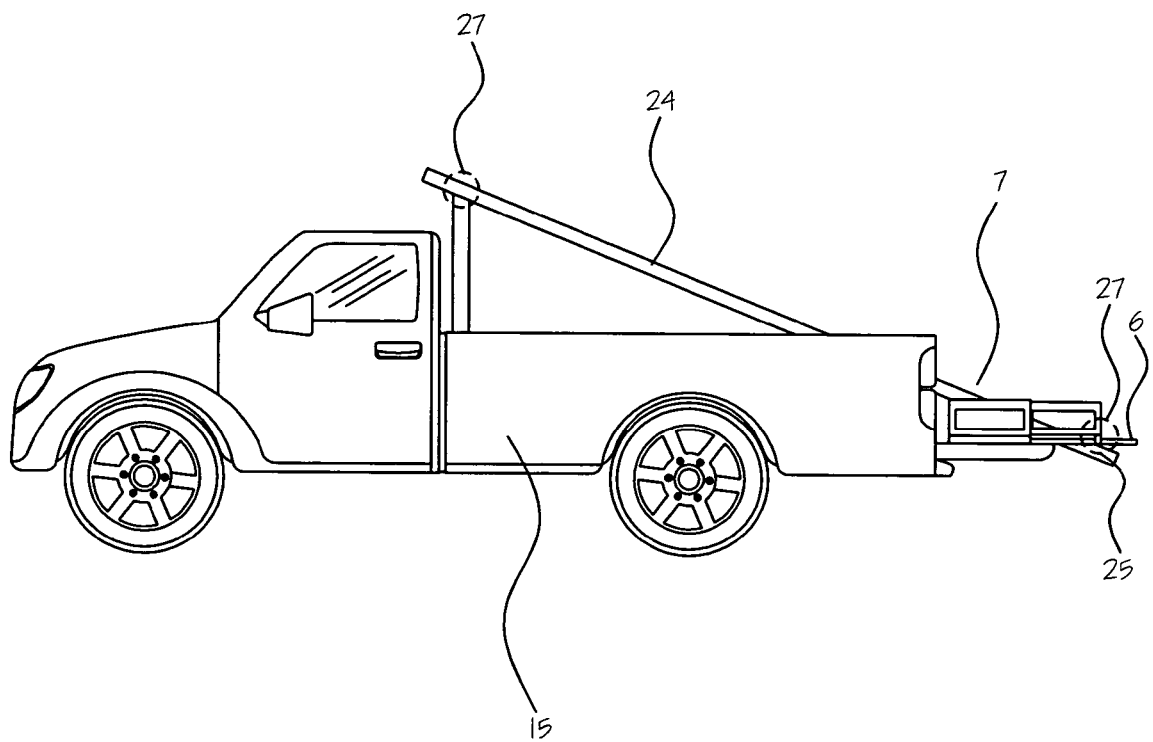
FIG. 4 is a side view of a long ladder loaded on a pick-up truck equipped with an adjustable truck box extender flip fate of the current application.
Figure 5:
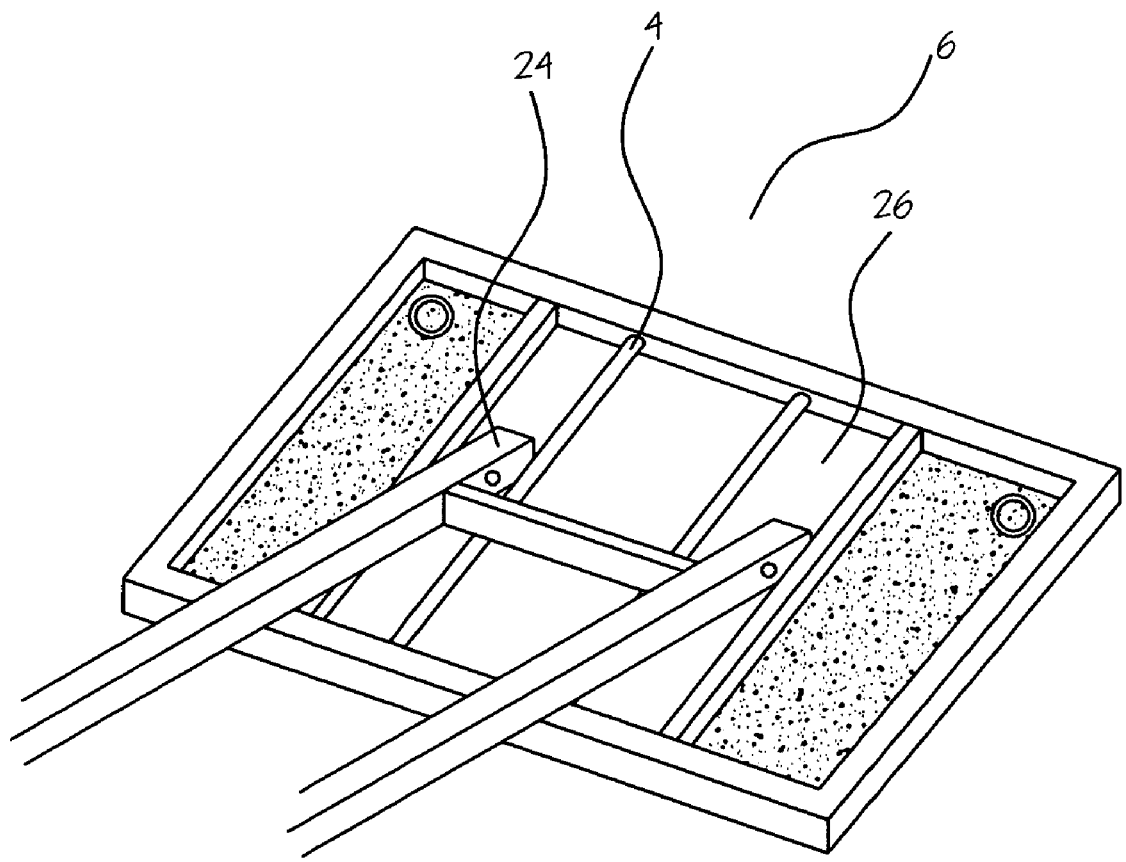
FIG. 5 is a perspective drawing of a ladder's leg engages to a rack placed on the adjustable fate when the first front face of the fate is expanded in a horizontal position.

However, when the flip gate (1) is expanded, a space for loading additional cargos of a big cargo whose length is longer than the length of the floor of a pick-up truck plus the stretched tail gate (14). FIG. 4 is a side view of a long ladder (24) loaded on a pick-up truck (15) equipped with an adjustable truck box extender flip gate (1) of the current application. Tip (25) of the ladder protrudes below the first front face (6). But, the tip is held by the stainless steel pipes (4). FIG. 5 is a perspective drawing of a ladder (24)'s leg engages to a rack (26) developed on the first front face (6) when the adjustable gate is expanded in a horizontal position. For the loading of such cargos, metal mesh (9) behind the stainless steel pipes (4) is eliminated from the first front face (6). If the ladder (24) is tied to the two points (27), the long ladder (24) is loaded on the pick-up truck more stably than any other loading position.

Figure 6:
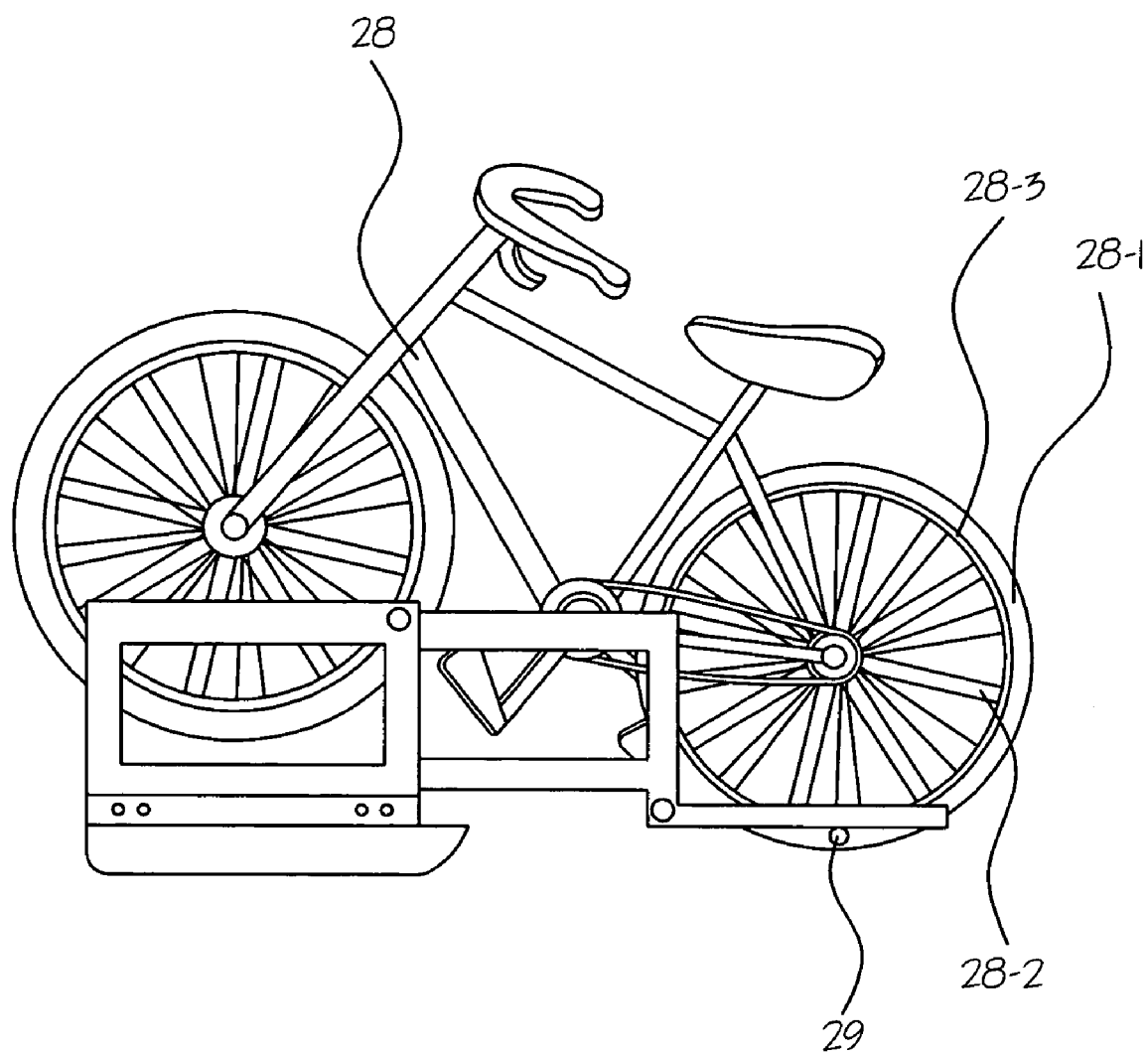
FIG. 6 is a side view of a bicycle loaded on a pick-up truck equipped with an adjustable truck box extender flip gate of the current application.

FIG. 6 is a side view of a bicycle (28) loaded on a pick-up truck (15) equipped with an adjustable truck box extender flip fate (1) of the current application. For bicycle (28), bottom of a real wheel (18-1) is inserted in a rack (26) formed between two neighboring stainless steel rods (4). A cross bar (29) between the spokes (28-2) and the rim (28-3) easily stabilize the bicycle (28) on the first face (6) of the adjustable truck box extender flip gate (1) of the current application.

Figure 7:
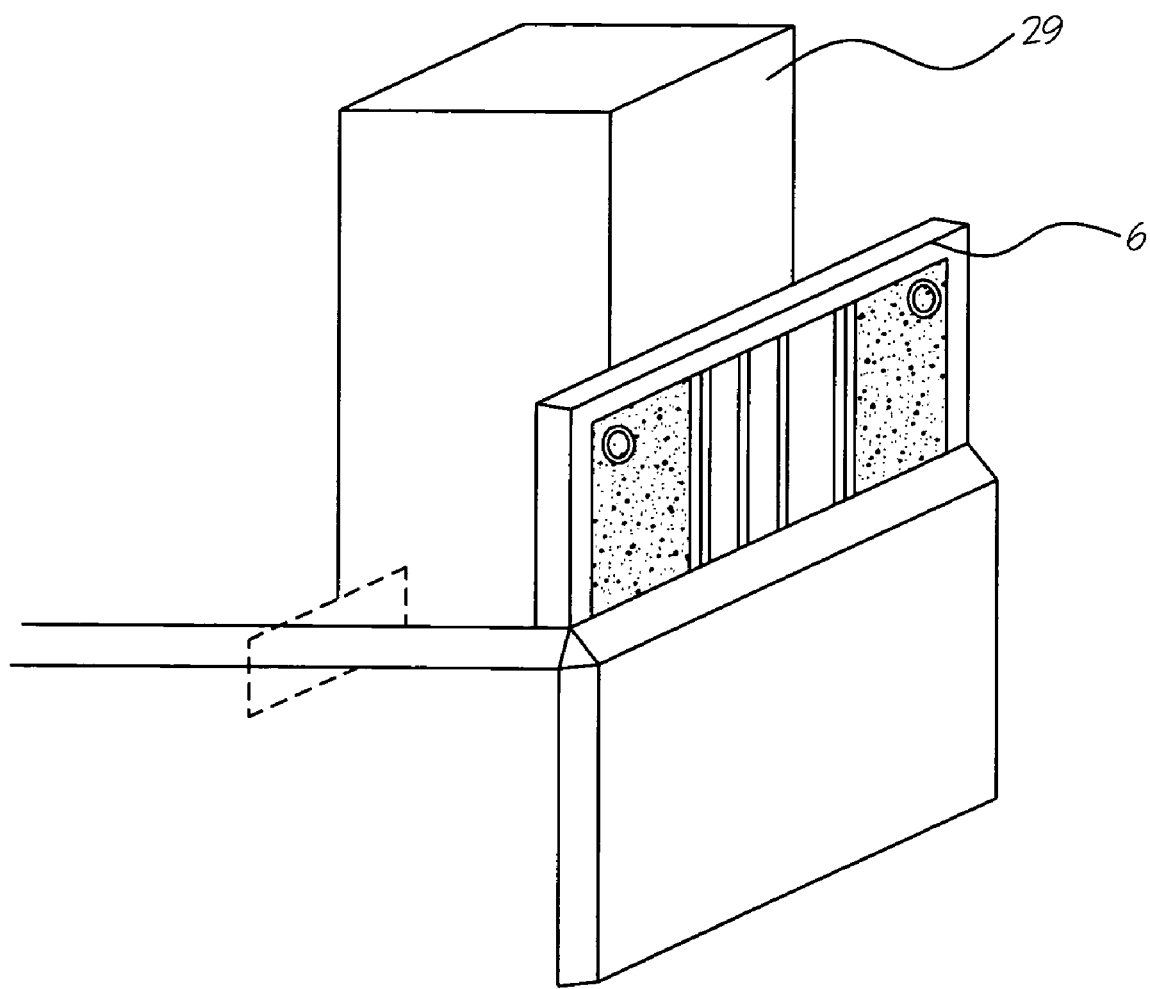
FIG. 7 is a perspective view of the adjustable truck box extender flip gate of the current application when the first front face of the fate is in expanded position and the tailgate of a pick-up truck is closed.

FIG. 7 is a perspective view of the adjustable truck box extender flip gate (1) of the current application in an expanded position when the tail gate (14) of a pick-up truck (15) is closed. By pulling out the first front face (6) upward, the height of the pick-up truck box (2) is extended and a higher cargo (29) can be loaded therein.

Figure 8:
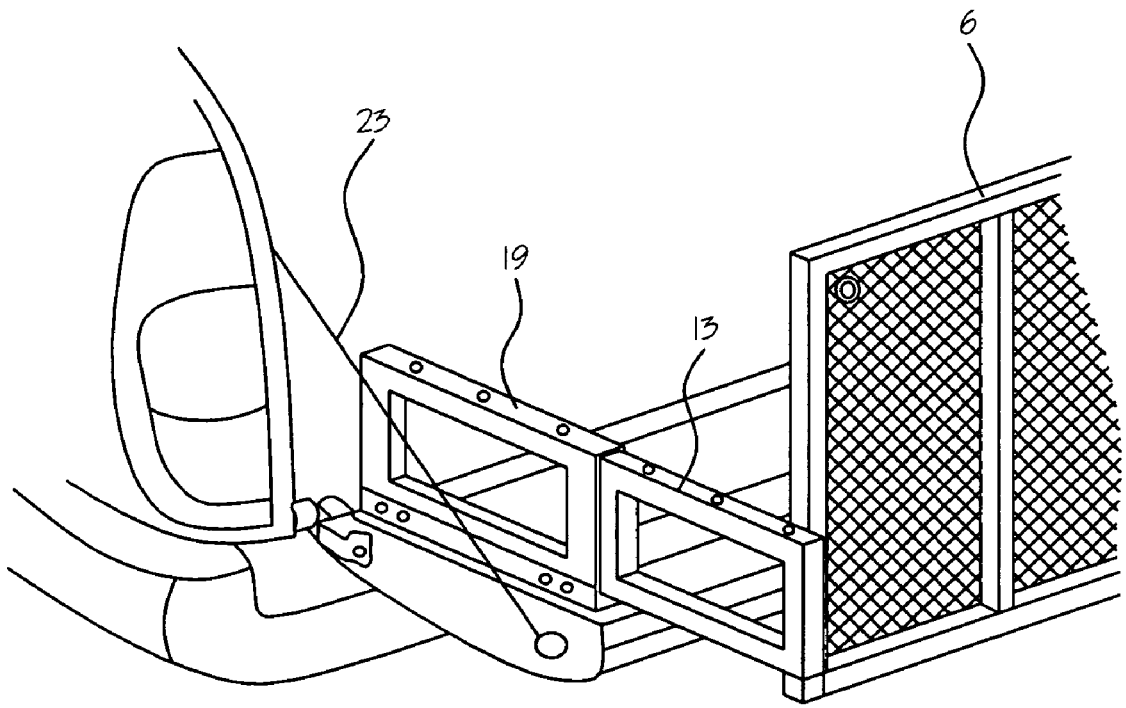
FIG. 8 is a perspective view of the adjustable truck box extender flip fate of the current application when the first front face of the gate is in a perpendicular position to a tailgate when the tail gate is open.

For a cargo (30) having a volume larger than the volume of the truck box (2), the adjustable truck box extender flip gate (1) of the current application is expanded and the first front face (6) is lifted up in a position vertical to the tail gate (14) of the pick-up truck (15) as shown in the FIG. 8 while the tail gate (14) is open. Even in that case, only strut brace (23) is enough to hold the tail gate (14) because the metal frame (19) and metal guides (13) support the first front face (6).

The novel structure of the adjustable truck box extender flip fate of the current application enables not only loading more cargos to a pick-up truck but also load the cargos more stably on the expanded space.

What is claimed is:

1. An adjustable truck box extender flip gate, which is installed in a truck box without removing tool boxes which are already installed thereof is comprised of:
    a tail gate attaching frame that is comprised of two long metal plates of ¼ inch thickness, which are horizontally fixed to inside surface of a tail gate of a pick-up truck by screwing bolts through bolting holes, and
    a first front face that is comprised of ½ inch by ½ inch square metal pipes connected by welding in a large rectangular shape and two or more vertical pipes, stainless steel rods, and carbon steel mesh reinforce the front face and a male screw is developed on one end of each stainless steel rod and one pin hole for a stopper pin is formed on the other end of the stainless steel rod, and
    a second front face that is made of one stainless steel sheet of ¼ inch thickness having a plurality of racks developed thereon to receive wheel of bicycle or leg of ladders and is rotatably connected to the first front face via plurality of hinges, and
    two side faces that are perpendicular to the first front face are comprised of;
        two, 1 inch by ½ inch, rectangular metal pipes that are welded to both ends of the two long metal plates of the tail gate attaching frame, and
        two metal frames made of ¼ inch metal plates, having a rectangular empty space in each frame and are welded to the two rectangular pipes of 1 inch by ½ inch positioning vertical to the long metal plates of the tale gate attaching frame, and
    two guides, each of them is comprised of;
        four ½ inch square pipes of same length welded each other at the ends, and
        two rear pipes each of which is welded to the rear upper end of the guide and each of which has one hole to receive the first front face rotatably.

* * * * *